(12) United States Patent
Zante

(10) Patent No.: US 10,044,319 B2
(45) Date of Patent: Aug. 7, 2018

(54) ELEVATED LONG SPAN SOLAR PANEL MOUNTING SYSTEM

(71) Applicant: Anthony A. Zante, Union City, CA (US)

(72) Inventor: Anthony A. Zante, Union City, CA (US)

(*) Notice: Subject to any disclaimer, the term of this patent is extended or adjusted under 35 U.S.C. 154(b) by 17 days.

(21) Appl. No.: 14/231,044

(22) Filed: Mar. 31, 2014

(65) Prior Publication Data

US 2017/0179870 A1   Jun. 22, 2017

Related U.S. Application Data

(60) Provisional application No. 61/806,743, filed on Mar. 29, 2013, provisional application No. 61/806,756, filed on Mar. 29, 2013.

(51) Int. Cl.

| | |
|---|---|
| *F24J 2/52* | (2006.01) |
| *H02S 20/23* | (2014.01) |
| *F16M 11/20* | (2006.01) |
| *H02S 20/30* | (2014.01) |

(52) U.S. Cl.
CPC ......... *H02S 20/23* (2014.12); *F16M 11/2021* (2013.01); *H02S 20/30* (2014.12)

(58) Field of Classification Search
CPC .......... F24J 2/5232; F24J 2/526; H02S 20/00; H02S 20/10
USPC ....................... 248/237; 52/173.3, 655.1, 698
See application file for complete search history.

(56) References Cited

U.S. PATENT DOCUMENTS

| | | |
|---|---|---|
| 3,028,706 A | 4/1962 | Falconer |
| 3,693,643 A | 9/1972 | Weber |
| 3,860,022 A | 1/1975 | Arndt |
| 4,187,123 A | 2/1980 | Diggs |
| 4,546,591 A | 10/1985 | Beltz |
| 4,819,399 A | 4/1989 | Onoda |
| 4,995,377 A | 2/1991 | Eiden |
| 5,016,403 A | 5/1991 | Fujita |
| 5,172,711 A | 12/1992 | Mueller |
| 5,228,258 A | 7/1993 | Onoda |
| 5,730,117 A | 3/1998 | Berger |
| 6,058,930 A | 5/2000 | Shingleton |
| 6,065,267 A * | 5/2000 | Fisher ...................... E04C 3/08 52/655.1 |
| 6,076,770 A | 6/2000 | Nygren |
| 6,152,157 A | 11/2000 | Jang |
| 6,321,501 B1 | 11/2001 | Ignash |
| 7,028,442 B2 | 4/2006 | Merrifield |
| 8,615,960 B2 * | 12/2013 | Marcotte .................... F24J 2/14 52/638 |

(Continued)

*Primary Examiner* — Steven M Marsh
(74) *Attorney, Agent, or Firm* — GSS Law Group

(57) ABSTRACT

An elevated trellis style long span solar panel mounting system with a deployable truss structure underneath that allows the solar array to be positioned at a height to eliminate or minimize shading from roof structures or mounted equipment that employs a force cancelling truss configuration to minimize side loads and the resulting bending loads on the roof support system to which it is attached, thereby eliminating the need for cross-bracing between mounting posts which limits roof access for re-roofing without solar system removal, and provides a means for adjusting the tilt angle, height, and mounting post spacing by sliding truss members to the appropriate positions.

7 Claims, 6 Drawing Sheets

(56) References Cited

U.S. PATENT DOCUMENTS

| | | | | |
|---|---|---|---|---|
| 8,684,190 B2 * | 4/2014 | Abar | .................. | F24J 2/5233 |
| | | | | 126/600 |
| 2012/0180407 A1 * | 7/2012 | Rees | .................. | E04C 3/08 |
| | | | | 52/173.3 |
| 2012/0291374 A1 * | 11/2012 | Zante | .................. | F24J 2/5232 |
| | | | | 52/173.3 |
| 2014/0190096 A1 * | 7/2014 | Kacandes | .................. | E04D 13/0481 |
| | | | | 52/173.3 |
| 2014/0190556 A1 * | 7/2014 | Conger | .................. | H01L 31/042 |
| | | | | 136/251 |

* cited by examiner

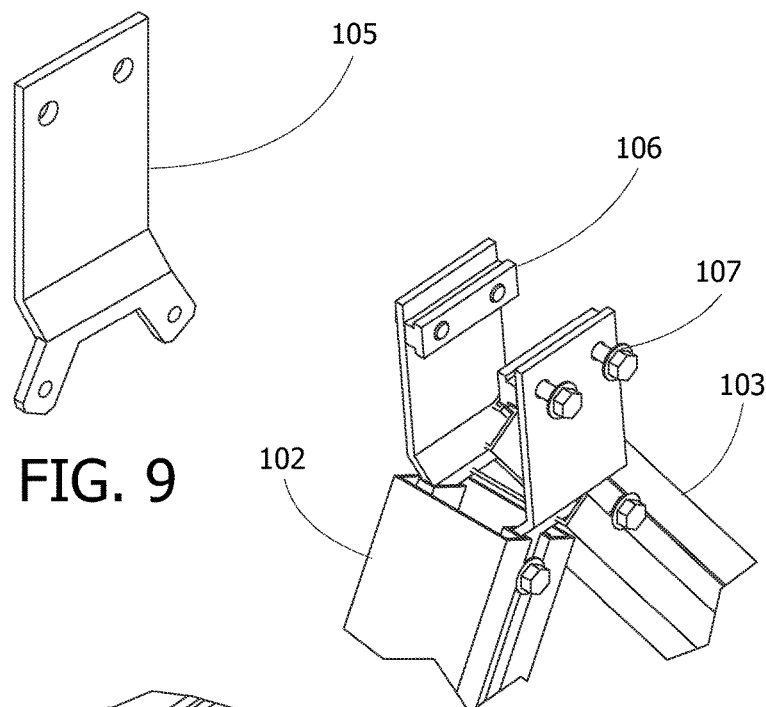
FIG. 9
FIG.10
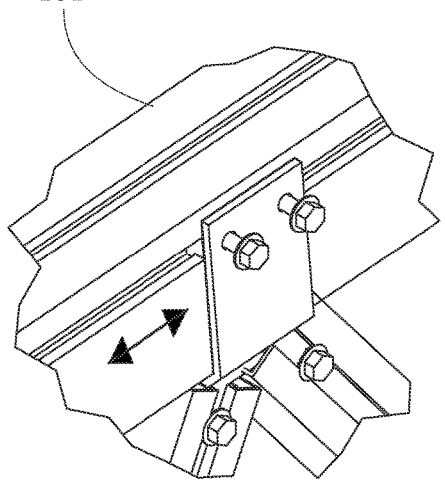
FIG. 11

ELEVATED LONG SPAN SOLAR PANEL MOUNTING SYSTEM

FIELD OF INVENTION

This invention relates to a solar mounting system for supporting solar panels in an elevated position above the roof of a building that connects to the main roof beams in a building and has the capacity to substantially reduce the applied loads on these beams. This field deployable structure has as its main components balanced reaction load triangular truss structures that minimize bending stresses on roof beams and allow simple field adjustment of the tilt angle and array height. The double W style trellis structure provides high clearance from above the roof level to minimize shading from other roof mounted structures and cost-effective re-roofing without removal of the solar system.

BACKGROUND

Over the years there have been a wide range of solar roof mounting devices to support solar panels on the roof of buildings. These mounting systems typically incorporate anchor posts or ballasts to hold the solar panel assembly in place on the roof and various solar frames or racks connected to the posts or weights to support and clamp the panels in place. The frames or racks comprise rolled steel or extruded aluminum beams and rails with sheet metal, welded and machined connecting components.

One such solar mounting system is the ballasted type system which utilizes weights, typically in the form of concrete pavers or other common building materials situated in trays that in turn are mounted to framing or strut members that support and hold the solar panels in place (FIG. 1). The main advantages of this type of roof mounting system is that it minimizes the number roof penetrations and evenly distributes the load on the roof. However they suffer from the following disadvantages:

Creates more weight on the roof than other systems
Can cause abrasive damage to the roof due to shift of solar mass due to wind or seismic activity
Low profile us subject to shadowing from other equipment on roof
Does not allow access for re-roofing unless the solar array is completely removed Traditional solar support racking structures that anchor to the roof or the roof beams include posts that are anchored by means of fasteners are used widely on all types of roofs. These types of devices provide a light weight alternative to ballasted or weighted systems (FIG. 1). The majority of these types of mounting systems have large numbers of mounts to the roof to better distribute the loads imposed by the solar array. Typically is on average one anchor per panel or approximately one anchor per 15 to 20 square feet of roof area.

Although this type of mounting structure overcomes the first two of the disadvantages noted for ballasted systems it nevertheless has in common the second two disadvantages noted above. In addition to those disadvantages the large number of anchors to the roof create more potential for roof leakage. Additionally, the cost of both creating and subsequently sealing these penetrations substantially increases the cost of these mounted systems.

Alternative solar mounting methods have been developed to overcome the disadvantages noted above. Efforts have been made to minimize the number of mounts on the rooftop required to support the solar systems which have included truss style supports. These truss style systems not only reduce the number of penetrations but also provide the advantage of raising the solar array so that there is less possibility of shadowing by adjacent equipment on the roof. They may also provide better access to roofs for repair and for re-roofing.

Some work has been done over the years to develop cost-effective field deployable truss structures for long span applications. Ignash, U.S. Pat. No. 6,321,521, developed a collapsible 3 sided truss structure that allows the three framework sections to be folded together to form the truss beam. Nygren, U.S. Pat. No. 6,076,770, developed an inwardly foldable truss to reduce space for shipment. Merrifield, U.S. Pat. No. 7,028,442, developed a linearly expandable truss structure that allowed variable length structures. And Beltz, U.S. Pat. No. 4,546,591, developed a truss structure with removable pins to allow the structure to be collapsed.

Although truss style solar mounting structures overcome the disadvantages noted above they suffer from the disadvantage of possibly creating excessive reaction loads at their positions of attachment to the roof beams. These reaction loads can cause substantial bending or twisting of the roof beams to which they are mounted. Building roof structures are designed to withstand gravitational forces and lift forces associated with wind velocity. However roof beam support structures are not designed to withstand excessive bending or twisting of the roof beams.

Bending loads can be transmitted into building structures from the horizontal wind load applied to the tilted panels positioned above the roof. The bending moment is created by a wind load force, F, pushing on the solar array a distance, D, above the roof. The bending load is expressed by the relationship: $M=FD$, where M is the bending moment applied to the roof beam, caused by the force F applied at a distance D above the roof structure. Because the panels are positioned in an elevation well above the roof line, this bending load can be quite substantial. creating a high bending moment on the roof beam.

The bending load on the posts can be substantially reduced by using a truss structure with the vertex of the truss positioned at the mounting post. By doing this the horizontal force at the elevated panel height can be transmitted through the truss members connected directly to the posts. The bending load is then considerably reduced since the reaction force is now located down at the post instead of at the panel height.

Although the truss support type structure reduces high bending loads caused by elevated panels it suffers from the disadvantage of requiring truss members to be connected between posts to "close the triangle" and eliminate any large horizontal reaction loads at the vertex of each post. These truss members are necessarily connected between adjacent mounting posts to reduce the reaction load. Unfortunately these mounting post connecting truss members get in the way of re-roofing or repairing the roof and it may become necessary to remove the solar system in order to perform these functions at a considerable expense.

A further disadvantage of truss structures is that it is difficult to field modify the tilt angle of the panels to adjust for latitudinal variations or equipment interference and shadowing. Typically truss structures are pre-fabricated and erected in the field with a fixed tilt angles. If a change needs to be made to the tilt angle the prefabricated components will have to be rebuilt to obtain the new tilt angle desired. This absence loss of field tilt adjust flexibility can be a nuisance and time-consuming.

Another disadvantage of truss structures is that the height of the array cannot be adjusted in the field. Most roof structures have variations in height. This height variation can cause shadowing between adjacent arrays. If the height of the array had height adjustment capability this problem could be avoided.

Another disadvantage of truss structures is that the post mounting positions are generally fixed with little allowance for adjusting the spacing. If there are variations in the spacing of the roof beams to which they attached, it may be difficult to accommodate these variations without making modifications to the truss system.

In summary there is a need for a solar mounting structure that eliminates the disadvantages noted above for existing systems and provides the following:
- Allows higher elevation for the solar arrays to reduce shading from roof mounted equipment
- Minimizes bending stresses on building roof members caused by elevated solar arrays
- Minimizes the number of support members required close to the roof that would interfere with re-roofing and require removal
- Minimizes the number of posts and resultant roof penetrations
- Has field adjust capability to change the tilt angle
- Has field adjust capability to modify the height
- Has field adjust capability to modify the mounting post positions.
- Light weight structure to minimize the gravitational load impact on the roof
- Eliminates roof wear and abrasion associated with ballast systems

SUMMARY

One feature of this deployable truss structure of the current invention is its relatively high height which minimizes or eliminates shadows that would otherwise be created by rooftop equipment. There are many advantages of this feature. This elevated height can substantially increase the amount of solar panels that can be put on a roof. By raising the array up there is less shadowing by roof structures and roof mounted equipment therefore allowing more solar area. Secondly, fire access lanes are generally required on all roofs. With trellis height systems fire access corridors are available throughout the underside of the array as long as the trellis height is sufficiently high to meet fire marshal requirements. Another advantage of the special height is that the solar panels more easily dissipate heat than lower mounted systems which increases the efficiency and productivity of the array.

This trellis height feature is made possible by the way the truss structure is oriented and mounted to the posts and roof beams below. Another advantage of this invention is its ability to substantially reduce any twist, or bending moment, normally imparted to the roof structure by wind loads at the trellis height panel elevation. This is particularly important for steel buildings roofs where the long spans supports will be attached to the main steel beam support structures. Most steel beam structures supporting roofs are wide flange type beams which are unable to withstand significant twist loads. It is only by substantially reducing major twist of these beams are we able to successfully attach to them. By design, the symmetrical orientation of the truss structure allows horizontal reaction loads at the vertex of the structure to be essentially canceled which substantially reduces the side load stresses on the posts and building roof support beams. By reducing these side loads there is no need to connect the posts together with structural connector beams located close to the roof itself. This would make it more difficult to re-roof because these low mounted beams would be in the way.

Another feature of the trellis system is that because of its lower chords posts can be further apart allowing much fewer posts than conventional solar mounted systems. Conventional solar mounting structures have approximately 1 penetration per panel for commercial rooftops. The trellis solar mounting system only requires one penetration for every 6 panels. This substantially reduces both mounting time as well as reducing roof sealing costs.

Another advantage of this trellis structure is its ability to vary the tilt angle in the field. This is an important feature for roofs that have varying slopes to facilitate drainage or due to construction tolerances. This also allows for fine tuning to adjust the arrays to maximize solar output and minimize shading. This tilt adjust is facilitated quite simply by sliding the slide mounting brackets that connect the two outer chord truss elements along the main beam axis.

Another advantage of this invention is its height adjustability in the field. By simply changing the spacing between the base mounting posts, the array can be height adjusted. This is important where there are roof height inconsistencies and where arrays may need to be spaced closer together which may require one of the arrays to be raised to prevent shadowing.

Another advantage of this invention is its ability to vary the positions of the support posts in the field. This may be necessary if the roof support beams are not spaced in accordance with the plans used to layout the solar array or because of roof beam spacing tolerances In summary, there are many advantages of this truss supported long span trellis beam structure compared with prior art including the following: Allows mounting at higher elevations on roof for increased solar capacity. Balanced truss loads minimize reaction loads on the roof beams. This truss support substantially reduces the number of mounts and roof penetrations compared to other commercial products. Solar array tilt angle is field adjustable to better match arrays. Elevated height allows easy re-roofing at any time. Solar array height can be adjusted to better match arrays on an uneven roof environment. Spacing of posts is field adjustable to allow for variations in beam positions.

In the first aspect of this invention it is configured in a trellis style truss structure with an upper chord including a main solar support beam that supports solar panel rails that are mounted across this structure to an adjacent trellis structure or structures. This main solar support beam is positioned at an approximate height range of a few feet to over ten feet. The upper chord has slots to accept connection of other devices. The lower chord truss members support the main beam and connect to mounting posts that in turn connect to building roof beams. There are typically two pairs of lower chord members each pair of which forms a V shaped configuration (FIG. 4). One of the key features of this invention is the symmetrical configuration of its lower chord truss members. The two lower chord truss members that join to form a vertex connecting to each mounting post are positioned at angles that are approximately equal and opposite with respect to vertical and essentially cancel out the respective side load transmitted through each truss member. This eliminates or substantially reduces any reaction side loads exerted on the post to which they are attached which in turn minimizes the bending moment imparted to the posts and roof beams to which they are attached. This balanced horizontal load on each post has the benefit of not requiring any base truss members to connect mounting posts together which would get in the way of re-roofing that building at a later date.

In a second aspect of this invention the lower chord truss member positions can effect tilt angle changes in the mounting system. These lower chord truss members are attached to the upper chord or main beam by means of support brackets that allow the lower chord ends to slide into any position along the length of the main beam and thus allows more flexibility in the configuration of the solar mounting system. There are four truss members connecting between the main beam and the roof mounting posts to form W shape. The lower chord ends that join with the upper chord includes two joined to the upper chord approximately in the center and the remaining two lower chords that connect to the upper chord, one towards the south end and one towards the north end. By sliding the lower chord where it is connected to the upper chord on the south side of the main beam towards the south end of the upper chord and further away from center, and sliding the other lower chord that is connected to the north end of the upper chord towards the center and away from the north end the main beam and attached solar array is tilted downward toward the south end effecting a counterclockwise tilt angle change which increases the tilt angle.

Another change that can be made in the field is the height change. By moving the two mounting posts closer together it narrows the W lower chord truss structure causing the solar mounting system to raise up. Conversely the array can be lowered by increasing the distance between posts.

In a third aspect of this invention the array can be adjusted forward or backward with respect to the mounting posts by sliding the main beam to the desired position relative to the main posts prior to tightening the connection bolts that clamp the main beam in place.

In accordance with the present invention it includes an elevated trellis style mounting system with a main beam or upper chord and a truss structure comprising lower chord truss members that are configured in a V shape such that they equal and opposing angles about a vertical axis to substantially reduce side loads exerted on the post and to the roof beams to which they are attached. This eliminates the requirement for base truss members which allows re-roofing without needing to remove the solar array. The invention further comprises long span beams that substantially reduce the number of mounting posts required for an array with generally only 1 mounting post for every 6 solar panels. The invention further comprises truss members and sliding brackets that allow the tilt angle to be field adjustable. Similarly these sliding brackets allow the height of the array to be adjusted and allow the main post spacing to be adjustable. The invention further comprises the ability to offset the main solar mounting beams with respect to the mounting posts for added flexibility when faced with limited roof support beam availability.

BRIEF DESCRIPTION OF THE DRAWINGS

FIG. 9 shows a view of a sliding truss mounting bracket FIG. 10 shows a view of a sliding truss mounting bracket connected to lower chord trusses FIG. 11 shows a view of a truss mounting bracket connected to lower chords and the main solar support beam

TABLE—DRAWINGS

100—trellis mounting system
101—main beam top chord
102—lower chord truss member—front
103—lower chord truss member—back
104—mounting post
105—slide mounting bracket
106—slide slot nut
107—bolt & washer
200—trellis array
201—solar panel
202—trellis mounting structure
203—panel support rail

DETAILED DESCRIPTION FIGS. 1 THROUGH 13—EXAMPLE EMBODIMENTS

Figure 1:
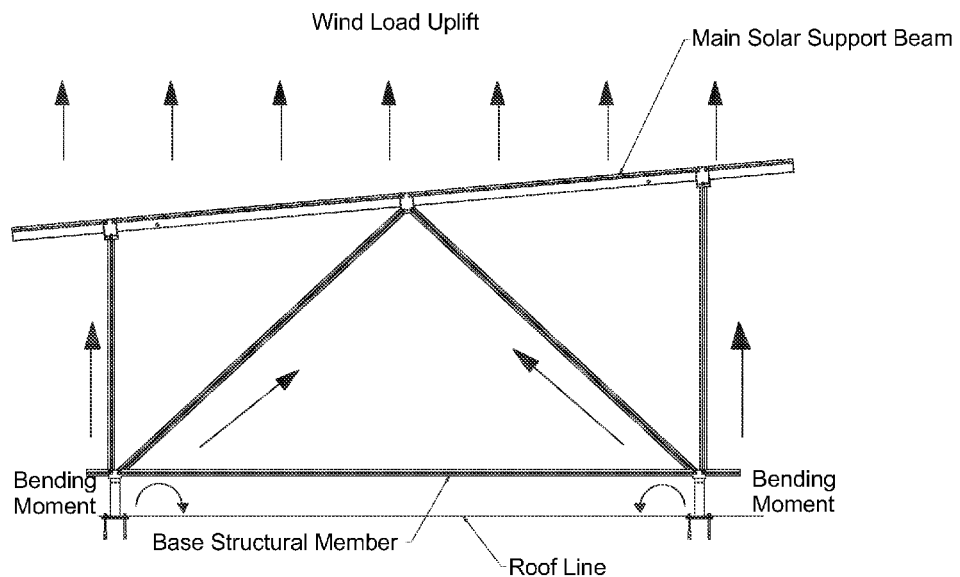
FIG. 1 shows a view of a conventional truss supported trellis mounting structure diagram
Figure 2:
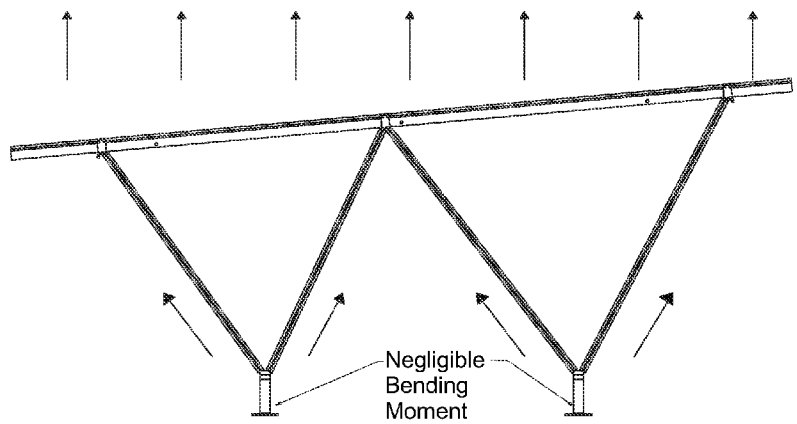
FIG. 2 shows a view of a W style truss supported trellis mounting structure diagram
Figure 3:
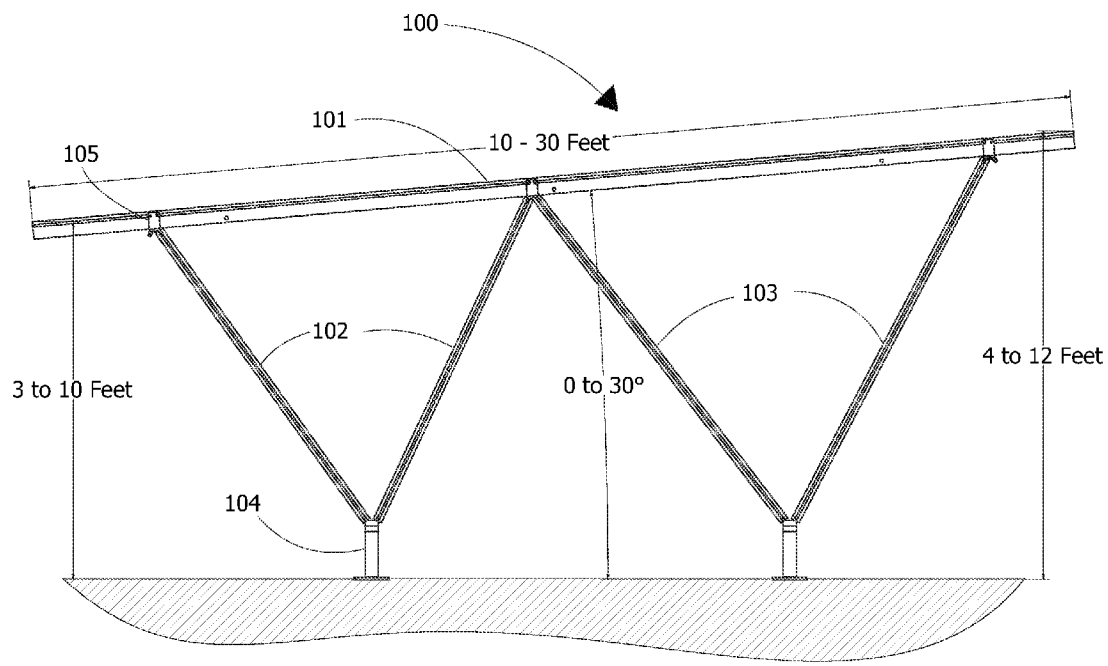
FIG. 3 shows a view of a W style truss supported trellis mounting system assembly at a 5 degree tilt
Figure 4:
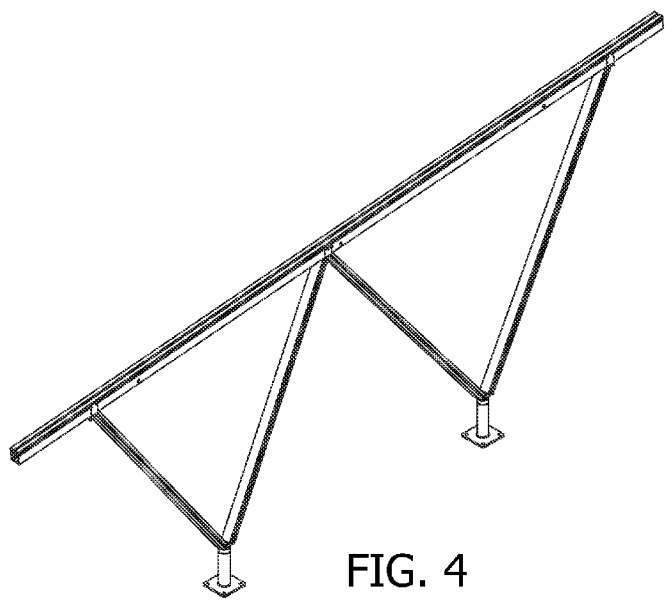
FIG. 4 shows a perspective view of a W style trellis mounting system with a 5 degree tilt
Figure 5:
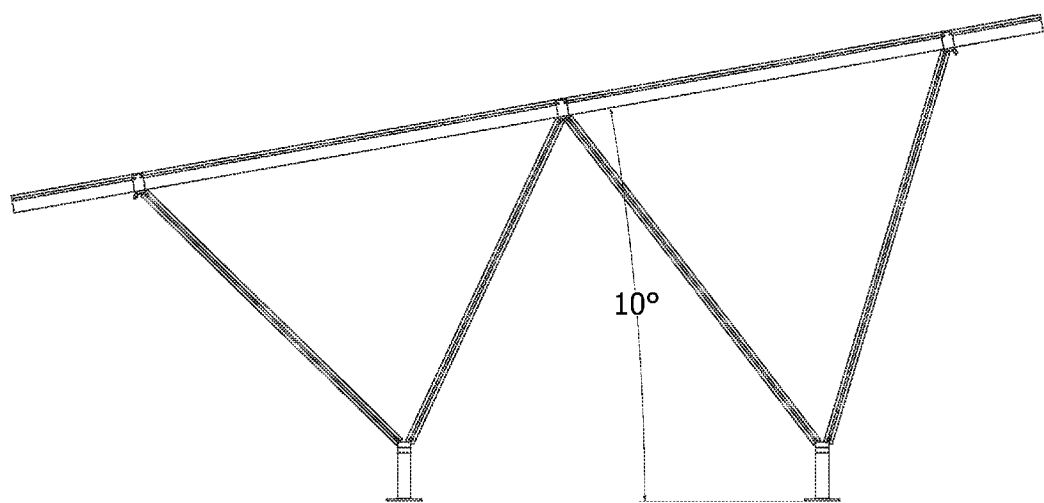
FIG. 5 shows a view of a W style trellis mounting system at a 10 degree tilt
Figure 6:
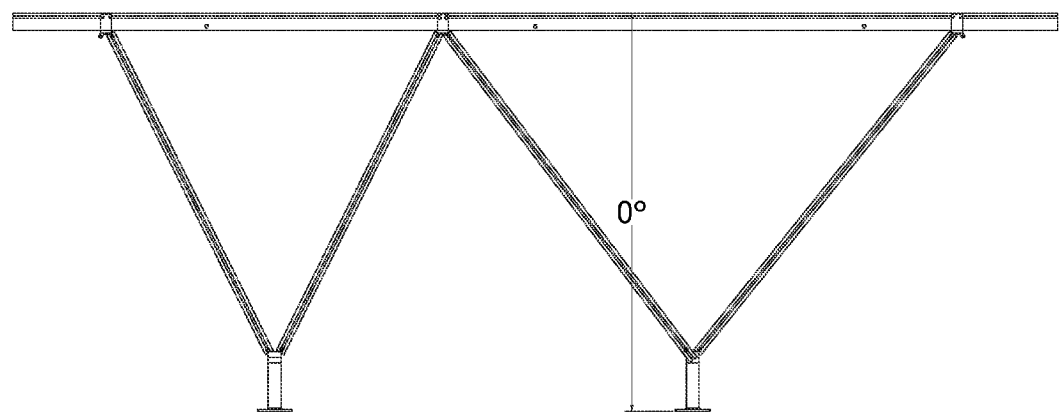
FIG. 6 shows a view of a W style trellis mounting system at a 0 degree tilt
Figure 7:
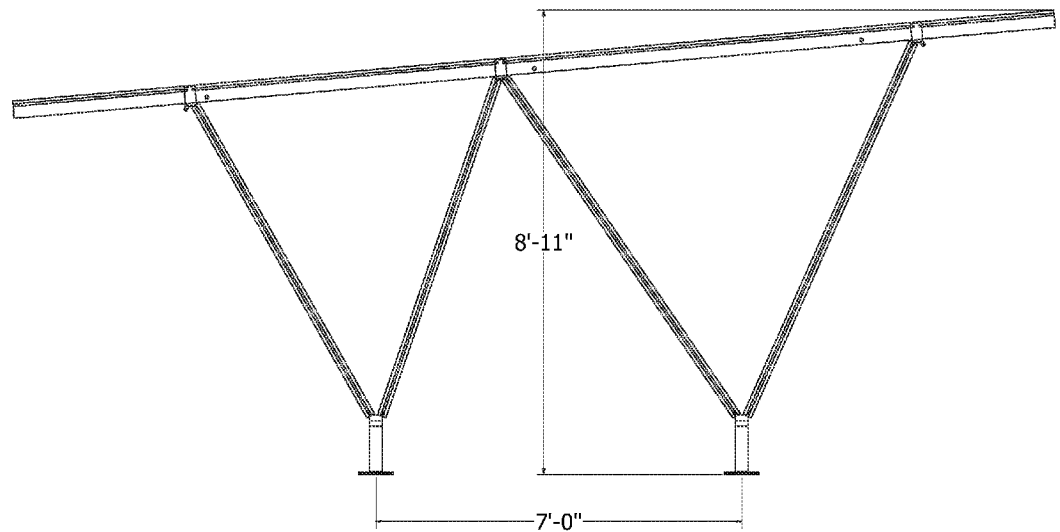
FIG. 7 shows a view of a taller, narrower W style trellis mounting system
Figure 8:
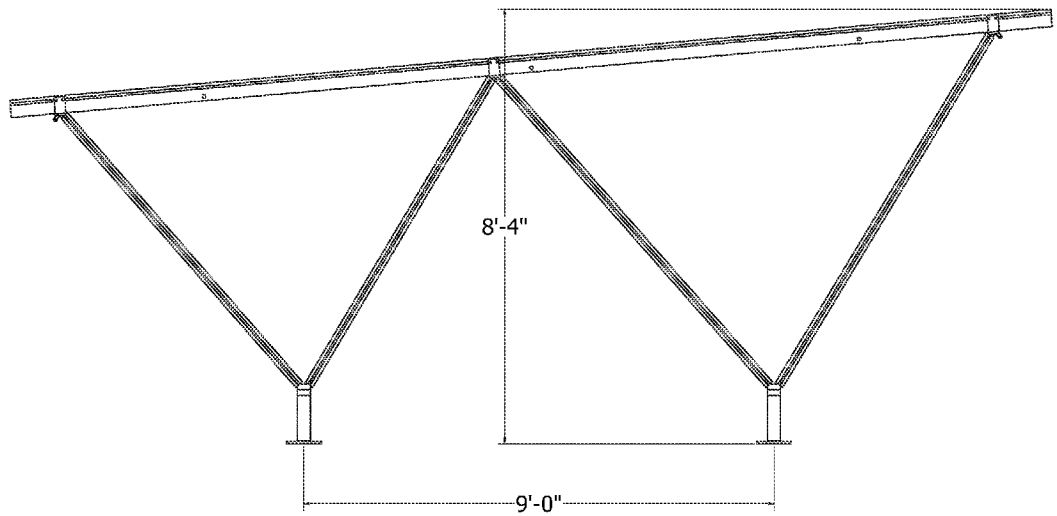
FIG. 8 shows a view of a shorter, wider W style trellis mounting system
Figure 12:
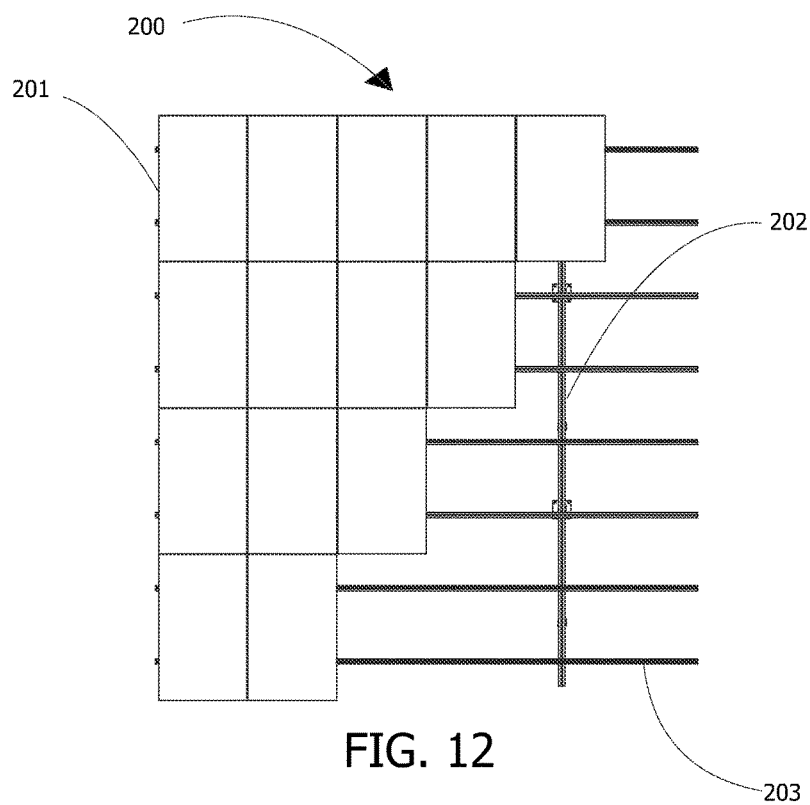
FIG. 12 shows a top view of a solar panel array supported by solar trellis mounting system
Figure 13:
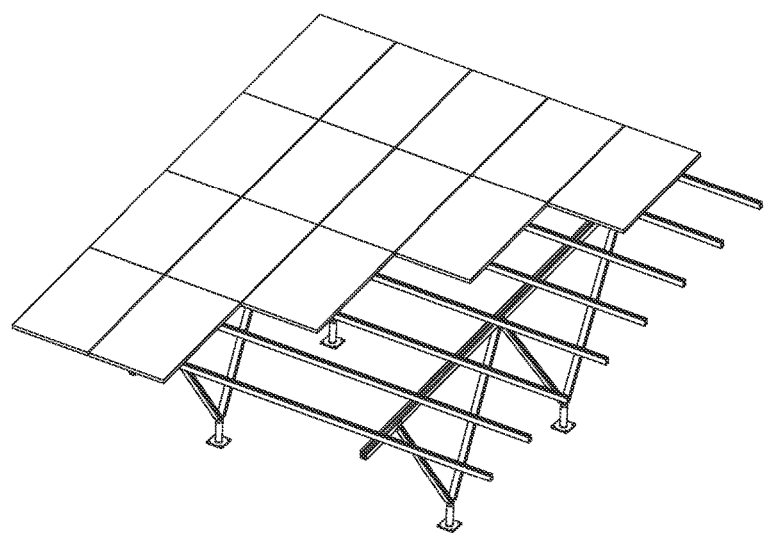
FIG. 13 shows a perspective view of an embodiment of a solar panel array supported by a solar trellis mounting system

FIG. 1 shows a conventional trellis structure and the main forces and bending moments applied to the post assemblies. FIG. 2 shows a W style trellis structure and the main forces and bending moments applied to the post assemblies. FIGS. 3 and 4 show the W style trellis in a typical 5 degree tilt angle. FIGS. 5 and 6 show the W style trellis with variations in the tilt angle—although they can vary widely. FIGS. 7 and 8 show the W style trellis with variations in height and post spacing although they can vary widely. FIGS. 9, 10 & 11 show details of how the sliding brackets are connected to the lower and upper chords of the W style trellis and how these brackets are slid along the main beam for strut positioning. FIGS. 12 and 13 show views of the solar panel mounting system array where the solar panel support rails 203 are mounted to two of the trellis style mounting structures and the solar panels 201 are mounted to the panel support rails.

The details of the long span trellis style mounting structure 100 are illustrated in FIGS. 3 and 4. An example of a complete trellis array is shown in FIGS. 12 and 13. This structure includes a main beam or top chord 101 that is the spine for connection of the panel support rails 203 shown later in FIG. 12. This main beam is typically an aluminum extrusion or rolled steel shape. An example of such a main beam and its method of connection to the solar panel supports are illustrated in U.S. patent application 20120291374. The main beam or top chord is supported and connected to the mounting posts 104 by the lower chord truss members 102 and 103. These truss members include two front, usually shorter members 102 on the south end of the structure and the taller members 103 are on the north or higher side of the array.

The slide mounting brackets 105, slide nuts 106 and bolt and washers 107 are used to both connect the lower chords to the upper chord and also to finalize the position and tilt angle of the support structure and array.

In the first aspect of this invention the two pairs of lower chord elements that connect between the upper chord and mounting posts are directed at an angle that forms triangular truss sections at the top and the bottom of the mounting structure 100. The lower ends of the two inside lower chord truss members, a front unit 102 and a back unit, 103 connect from the two mounting posts to the center of the upper chord main post. The lower ends of the outer front lower chord member and outer rear lower chord member connect from the two mounting posts to the outer positions on the top chord a short distance inward from each end.

FIG. 2 shows typical wind load lift forces generated on the trellis structure by the panels. This uplift creates forces on the top chord that are transmitted through the lower chords and into the mounting posts. because the truss members are positioned in a direction that has both vertical and horizontal force vectors. The horizontal force vectors are related directly to the angle each truss member makes with the vertical axis. The larger the angle, the larger the horizontal force vector is. In this invention the lower chord force vectors are made to cancel each other out by proper directional placement of the lower chord members.

This has the benefit of eliminating the need for truss members running along the roof between posts since the horizontal force vectors essentially cancel each other out. This is illustrated by comparing a conventional truss structure in FIG. 1 to the W truss structure in FIG. 2.

The two trellis structure mounting posts 104 connect to the building roof support beams. The robustness of the long span mounting structure allow the mounting posts to support 12 panels per post or more which keeps the roof penetrations to a minimum. The roof structural members that the mounting posts connect to are typically the main roof support members such as concrete slabs, Glulam beams or steel beam.

The mounting posts are spaced approximately 6 to 10 feet apart for most systems. However it is scalable to larger or smaller solar arrays so this dimension can vary widely. The mounting posts contain a mounting bracket that allows the lower chord truss members 102 to be quickly inserted and connected to the posts. Because the balanced reaction loads at each post, there is minimal bending load exerted at the post by the solar array. Therefore no base truss element is needed to connect the posts together.

Refer to FIG. 3 for the sequence of assembly. Step one begins with anchoring the two posts to the main roof structural members. In step two the inner two lower chord truss members are connected to the top of the two main posts. These members are joined at the top to the slide mounting brackets in the center. In order to minimize the side loads on the posts, the lower chords are brought up to the top with equal and opposing angles with respect to a vertical axis. The top chord is then loosely connected to the center slide brackets so that it can slide to fine tune the position, angle, and height of the array. The two outer lower chord truss members are similarly joined together.

In the second aspect of this invention the tilt angle can be adjusted to the desired value by sliding the slide mounting brackets to the correct location along the slotted main beam. There are three points of connection on the main beam. By allowing the truss members to slide along the axis of the main beam this can be accommodated. FIGS. 5 and 6 illustrate this—since the truss member lengths for this layout are the same as was used for FIG. 3.

In the third aspect of this invention changes in height can be made by changing the spacing of the mounting posts. Alternatively, if it is necessary to change the spacing of the posts due to variations in roof members this can be accommodated with a slight allowance for height variation. This can be seen in FIGS. 7 and 8.

For a full view of the solar panel array, see FIGS. 12 and 13. The attachment details for the rails connecting to the main support beam and the panel attachment to the rails are described in patent application 20120291374.

Thus the reader will see that the trellis style mounting structure provides a versatile device that allows the user to maximize solar capacity, provide easy access for re-roofing, while at the same time being able to minimize stress to the roof structure. While the above description contains many specificities these should not be construed as limitations on the scope of the invention, but rather as exemplifications of some of the preferred embodiments thereof. Many other variations and embodiments are possible.

Accordingly, the scope of the invention should be determined not by the embodiments illustrated, but by the appended claims and their legal equivalents.

The invention claimed is:

1. A mounting system for solar panels, comprising:
   a trellis mounting structure comprising:
      a main beam;
      three of a slide mounting bracket connected to said main beam;
      a first truss member connected to a first of said slide mounting bracket and to a first of a mounting post;
      a second truss member connected to a second of said slide mounting bracket and to said first mounting post;
      a third truss member connected to said second slide mounting bracket and to a second of said mounting post; and
      a fourth truss member connected to a third of said slide mounting bracket and to said second mounting post;
   a second of said trellis mounting structure; and
   a panel support rail connected to said trellis mounting structure and said second trellis mounting structure,
   wherein said trellis mounting structure does not include a structural member connected to both of said first and second mounting posts.

2. The mounting system for solar panels of claim 1, wherein said slide mounting bracket further comprises a slide slot nut attached near a first end of said slide mounting bracket.

3. The mounting system for solar panels of claim 2, wherein said first truss member is connected to an end of said first slide mounting bracket opposite said first end.

4. The mounting system for solar panels of claim 1, wherein another of said slide mounting bracket is attached to said second truss member, said third truss member, and said main beam, in opposition to said second slide mounting bracket.

5. The mounting system for solar panels of claim 1, wherein sliding said second slide mounting bracket along said main beam changes a tilt angle of said main beam.

6. The mounting system for solar panels of claim 1, wherein changing a separation distance of said first and second mounting posts changes a height of said main beam in said trellis mounting structure.

7. The mounting system for solar panels of claim 1, wherein a height and a tilt angle of said main beam are adjustable after said first, second, third, and fourth truss members are connected to said main beam.

* * * * *